United States Patent
Mahadevan

(10) Patent No.: US 12,034,600 B2
(45) Date of Patent: Jul. 9, 2024

(54) METHOD FOR FEDERATING A CLUSTER FROM A PLURALITY OF COMPUTING NODES FROM DIFFERENT FAULT DOMAINS

(71) Applicant: Hewlett Packard Enterprise Development LP, Houston, TX (US)

(72) Inventor: Nilakantan Mahadevan, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 69 days.

(21) Appl. No.: 16/446,288

(22) Filed: Jun. 19, 2019

(65) Prior Publication Data
US 2020/0403985 A1   Dec. 24, 2020

(51) Int. Cl.
*H04L 41/0893* (2022.01)
*G06F 15/16* (2006.01)
(Continued)

(52) U.S. Cl.
CPC ........ *H04L 41/0893* (2013.01); *G06F 15/161* (2013.01); *H04L 41/0806* (2013.01);
(Continued)

(58) Field of Classification Search
None
See application file for complete search history.

(56) References Cited

U.S. PATENT DOCUMENTS

| | | | |
|---|---|---|---|
| 6,515,966 B1 * | 2/2003 | Bardalai | H04L 45/00 370/236 |
| 6,778,531 B1 * | 8/2004 | Kodialam | H04L 45/00 370/256 |

(Continued)

OTHER PUBLICATIONS

Animesh Singh, "Make your microservices resilient and fault-tolerant using Istio", available online at <https://developer.ibm.com/code/2017/08/17/make-microservices-resilient-fault-tolerant-using-istio/>, Aug. 22, 2017, 5 pages.

(Continued)

*Primary Examiner* — Lance Leonard Barry
(74) *Attorney, Agent, or Firm* — Slater Matsil, LLP

(57) ABSTRACT

The present disclosure describes a plurality of examples for federating a cluster from a plurality of interconnected computing nodes. The examples disclose a controller receiving network information and enclosure information associated with the computing nodes. The network information is indicative of a network topology between the computing nodes. The enclosure information is indicative of a configuration of an enclosure associated with a corresponding computing node. The controller identifies fault domains based on the network information and the enclosure information. Each fault domain of the fault domains includes one or more computing nodes impacted by at least one of a corresponding network fault event or a corresponding enclosure fault event, and the plurality of fault domains comprise first, second, and third fault domains. The controller selects computing nodes from the fault domains for federating the cluster. The selected computing nodes comprise a first (Continued)

computing node from the first fault domain and a second computing node from the second fault domain. The selecting of the computing nodes favors selecting the first computing node from the first fault domain with a smaller quantity of computing nodes over the third fault domain with a larger quantity of computing nodes. The controller allocates the selected computing nodes in federating the cluster to execute workloads.

20 Claims, 6 Drawing Sheets

(51) Int. Cl.
*H04L 41/0654* (2022.01)
*H04L 41/08* (2022.01)
*H04L 41/0806* (2022.01)
*H04L 41/084* (2022.01)
*H04L 41/0853* (2022.01)
*H04L 41/12* (2022.01)

(52) U.S. Cl.
CPC ........ *H04L 41/084* (2013.01); *H04L 41/0853* (2013.01); *H04L 41/0886* (2013.01); *H04L 41/12* (2013.01); *H04L 41/0654* (2013.01)

(56) References Cited

U.S. PATENT DOCUMENTS

| | | | |
|---|---|---|---|
| 10,097,620 | B2 | 10/2018 | Reddy et al. |
| 10,120,734 | B1 | 11/2018 | Doraiswamy et al. |
| 10,148,504 | B2 | 12/2018 | Ahuja et al. |
| 10,153,941 | B2* | 12/2018 | Dion .................. H04L 12/4641 |
| 10,223,109 | B2 | 3/2019 | Lepcha et al. |
| 10,841,152 | B1 | 11/2020 | Humphreys |
| 10,911,558 | B1 | 2/2021 | Witzel |
| 2008/0256404 | A1* | 10/2008 | Funatsu ......... G01R 31/318342 714/724 |
| 2008/0304421 | A1* | 12/2008 | Ramasubramanian ...................... H04L 43/0852 370/251 |
| 2012/0005236 | A1 | 1/2012 | Deng et al. |
| 2012/0131193 | A1 | 5/2012 | Ferris et al. |
| 2012/0290714 | A1 | 11/2012 | Cohen |
| 2013/0232480 | A1 | 9/2013 | Winterfeldt et al. |
| 2013/0339991 | A1* | 12/2013 | Ricci .................. H04N 21/251 725/14 |
| 2014/0047227 | A1* | 2/2014 | Breternitz ............ G06F 9/5066 713/2 |
| 2014/0372533 | A1 | 12/2014 | Fu et al. |
| 2016/0036725 | A1 | 2/2016 | Syed et al. |
| 2016/0124742 | A1 | 5/2016 | Rangasamy et al. |
| 2016/0371020 | A1* | 12/2016 | Sarkar .................... G06F 3/067 |
| 2017/0149931 | A1 | 5/2017 | Lochhead et al. |
| 2017/0171019 | A1* | 6/2017 | Nayak .................. H04L 49/357 |
| 2017/0242784 | A1 | 8/2017 | Heorhiadi et al. |
| 2017/0257432 | A1 | 9/2017 | Fu et al. |
| 2017/0270697 | A1* | 9/2017 | Keys .................... G06F 40/143 |
| 2017/0295053 | A1 | 10/2017 | Tung |
| 2018/0026856 | A1 | 1/2018 | Yang et al. |
| 2018/0027080 | A1 | 1/2018 | Yang et al. |
| 2018/0270125 | A1* | 9/2018 | Jain .................... H04L 41/0668 |
| 2018/0309630 | A1 | 10/2018 | Zhao et al. |
| 2018/0349121 | A1 | 12/2018 | Bagarolo et al. |
| 2019/0188079 | A1* | 6/2019 | Kohli .................... G06F 3/0631 |
| 2019/0235775 | A1* | 8/2019 | Zwiegincew ......... G06F 3/0604 |
| 2019/0280476 | A1* | 9/2019 | Fan ........................ G01R 31/08 |
| 2019/0340059 | A1 | 11/2019 | Bagarolo et al. |
| 2020/0067763 | A1 | 2/2020 | Vytla |
| 2020/0192692 | A1 | 6/2020 | Ghag et al. |
| 2020/0296017 | A1 | 9/2020 | Mazzitelli et al. |
| 2020/0314006 | A1 | 10/2020 | Mackie et al. |
| 2020/0358876 | A1 | 11/2020 | Kulkarni et al. |
| 2020/0401457 | A1 | 12/2020 | Singhal et al. |
| 2021/0019194 | A1 | 1/2021 | Bahl et al. |
| 2021/0072912 | A1* | 3/2021 | Patel .................... G06F 3/0608 |

OTHER PUBLICATIONS

Dignan, "HPE launches Composable Cloud as it wades deeper into the hybrid cloud fray", available online at <https://www.zdnet.com/article/cloud-customers-pairing-aws-microsoft-azure-more-according-to-kentik/>, Nov. 26, 2018, 27 pages.

VMware, "Managing Fault Domains in vSAN Clusters", available online at <https://docs.vmware.com/en/VMware-vSphere/6.5/com.vmware.vsphere.virtualsan.doc GUID-8491C4B0-6F94-4023-8C7A-FD7B40D0368D.html>, Apr. 18, 2018, 2 pages.

Barshan, Maryam, et al. "Algorithms for network-aware application component placement for cloud resource allocation." Journal of Communications and Networks 19.5 (2017): 493-508. (Year: 2017).

Fazio, Maria, et al. "Open issues in scheduling microservices in the cloud." IEEE Cloud Computing 3.5 (2016): 81-88. (Year: 2016).

Truyen, Eddy, et al. "Towards a container-based architecture for multi-tenant SaaS applications." Proceedings of the 15th international workshop on adaptive and reflective middleware. 2016. (Year: 2016).

\* cited by examiner

600

| NODE | Node 435 | Node 445 | Node 455 | Node 465 | Node 468 | Node 475 |
|---|---|---|---|---|---|---|
| Node 435, FD1 | - | 4* | 4 | 4 | 4 | 5 |
| Node 445, FD1 | 4* | - | 4 | 4 | 4 | 5 |
| Node 455, FD2 | 4 | 4 | - | 4* | 4 | 5* |
| Node 465, FD2 | 4 | 4 | 4* | - | 4 | 5* |
| Node 468, FD3 | 4 | 4 | 4 | 4 | - | 5 |
| Node 475, FD2 | 5 | 5 | 5* | 5* | 5 | - |

Figure 6

METHOD FOR FEDERATING A CLUSTER FROM A PLURALITY OF COMPUTING NODES FROM DIFFERENT FAULT DOMAINS

BACKGROUND

The current disclosure relates to compute clusters. Clusters are systems which function as a closely coupled integrated unit taking a hybrid approach of combining the characteristics of loosely and tightly coupled systems. A cluster includes closely coupled multiple systems running a similar instance of operating system software with the ability to share resources like storage, memory, etc.

BRIEF DESCRIPTION OF THE DRAWINGS

The following detailed description references the drawings, wherein:

FIG. 6 is an example domain distance matrix for federating a cluster from a plurality of computing nodes.

DETAILED DESCRIPTION

Figure 1:
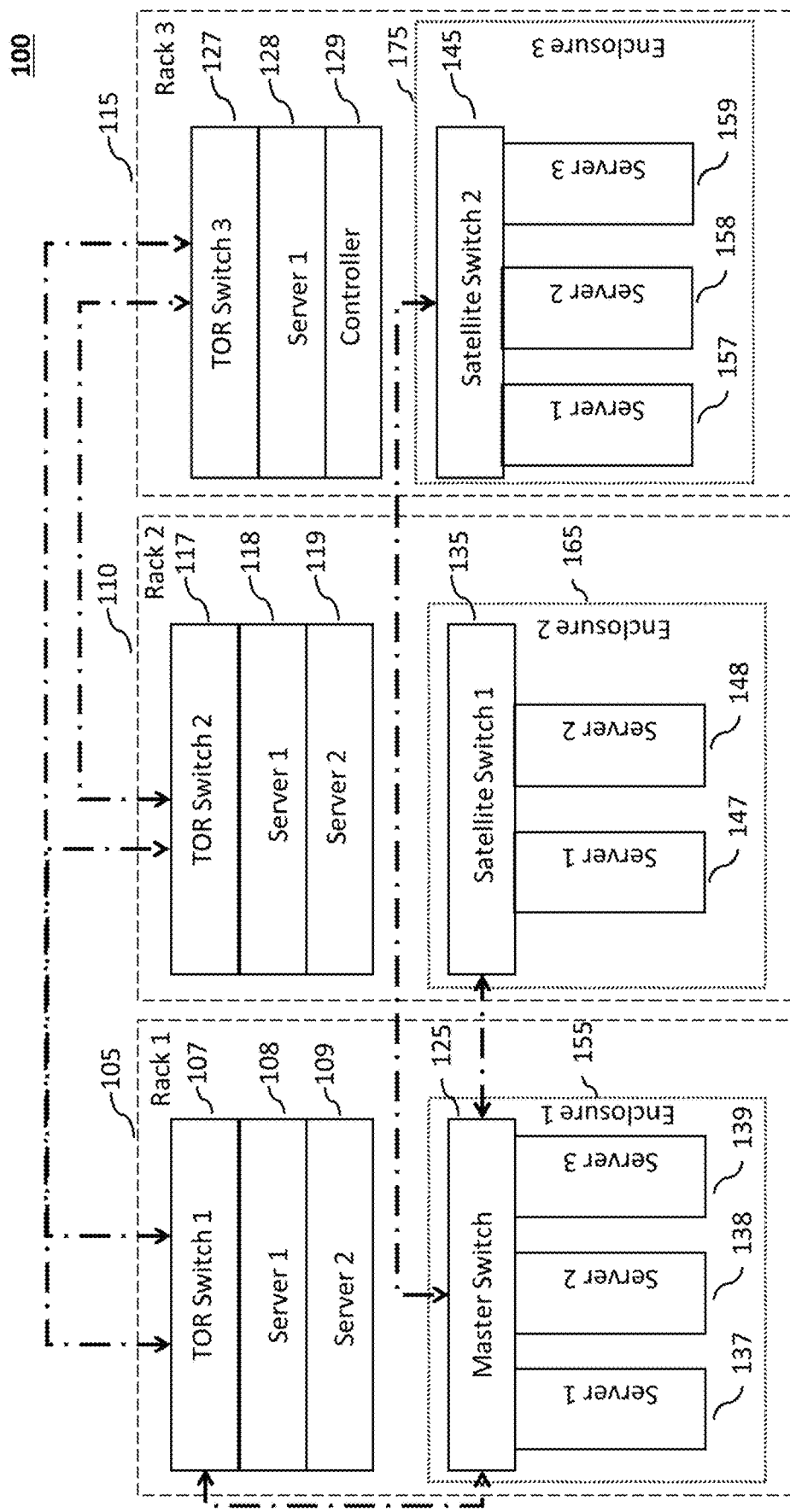
FIG. 1 is a block diagram of an example system for federating a cluster from a plurality of computing nodes.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The current disclosure discloses a method for federating a cluster from a plurality of interconnected computing nodes (also known as servers or compute devices). A conventional data center comprises a plurality of equipment including compute devices such as blade servers, rack servers; network devices such as master switches, satellite switches and Top of the Rack (ToR) switches, pass through switches, etc. In an on-premise data center, it is important to dynamically provision and spin up clusters using the computing nodes that are spread across multiple racks and blade server chassis. These computing nodes (also referred to as compute devices) which form the cluster, are either on a bare-metal host or on a hypervisor node host. For example, a Kubernetes cluster includes multiple master nodes, multiple infrastructure and worker nodes. The multiple master nodes should be able to communicate with each other using L3 protocol (TCP/IP).

However, it is important that they are also isolated to protect against network fault that can impact all of them once. Typically this is accomplished by placing them either in separate racks and connected through different ToR (Top Of the Rack) switches. In a hybrid topology environment including blade servers, rack servers, master-satellite switches and ToR switches, it is important to distribute nodes of a cluster by recognizing the network topology and enclosure information to provide fault isolation amongst the nodes of the cluster. This means that any network fault (a cable pull, switch fault, virtual switch failure, etc.) or enclosure or server chassis fault (power fault, etc.) will not affect all the nodes in the cluster and the impact is minimized when the cluster nodes are distributed in a fashion that provides the best possible fault isolation.

In a hybrid environment, a compute farm including compute devices, is spread as individual rack servers or as blade servers in enclosures. LAG (Link Aggregation Group) and MC teaming provide means of accomplishing high availability in such an environment. A network fault can effect a single server, single enclosure, and group of servers, group of VMs inside the enclosure or outside depending on the network topology and the nature of fault. There exists multiple fault zones in such a hybrid environment. Accordingly, the current disclosure describes an example method for identifying these fault domains and creating a logical graph model that includes physical and virtual fault domains based on the network topology and enclosure information. The example method enables to federate clusters with computing nodes spanning across different fault domains in an automated fashion to ensure maximum isolation of computing nodes with respect to any fault in the environment. This ensures that the cluster is highly resilient to multiple levels of fault in such a hybrid environment and also ensures a well-balanced infrastructure in terms of resource usage.

Accordingly, in a first aspect, the current disclosure describes an example method for federating the cluster from a plurality of computing nodes to address the above mentioned aspect. The method comprises receiving network information and enclosure information associated with the plurality of the computing nodes, identifying a plurality of fault domains based on network information and the enclosure information, and selecting the two or more computing nodes from the plurality of fault domains for federating the cluster. Network information is indicative of network topology between the plurality of computing nodes. Enclosure information is indicative of a configuration of an enclosure associated with a corresponding computing node. Each fault domain includes one or more computing nodes impacted by at least one of a corresponding network fault event and a corresponding enclosure fault event. The two or more computing nodes includes a first computing node from a first fault domain and a second computing node from a second fault domain.

In an example, a graph model is generated from the network information and the enclosure information. Each node from the graph model is indicative of one of a computing node or a network device or any other device which is associated with the computing nodes. Accordingly a plurality of nodes in the graph model are associated with the plurality of computing nodes. Each sub-tree in the graph model is indicative of a fault domain from the plurality of fault domains and comprises a root node and one or more child nodes where the one or more computing nodes or network devices associated with the child nodes are impacted by a fault associated with a computing node or network device associated with the root node. Based on the graph model, the two or more computing nodes for federating the cluster are selected.

In an example, the first and second fault domains form a disjoint set such that every node from the first fault domain is distinct from every node of the second fault domain. In an example, the network information is determined based on Link Layer Discovery Protocol (LLDP) packets exchanged between the computing nodes and network devices, and a Management Information Database (MIB) of the computing nodes and network devices. In an example, the network information comprises Internet Protocol addresses of the computing nodes, port group information of the ports on the computing nodes, and Local Area Network (LAN) information of the computing nodes. In an example, the plurality of interconnected computing nodes includes a first set of physical nodes and a second set of virtual nodes.

In a second aspect, the current disclosure discloses a cluster management system. The cluster management system comprises a plurality of computing nodes connected via a plurality of network devices. One or more computing nodes are enclosed in server enclosures and share a common power unit. Each computing node is connected to other computing nodes over one or more network domains. A controller connected to the plurality of computing nodes. The controller receives network information and enclosure information associated with the plurality of the computing nodes, identifies a plurality of fault domains based on network information and the enclosure information, selects the two or more computing nodes from the plurality of fault domains for federating the cluster, wherein a first computing node from the two or more computing nodes, is from a first fault domain and a second computing node from the two or more computing nodes is from a second fault domain.

In a third aspect, the current disclosure discloses a non-transitory machine-readable storage medium storing instructions that, when executed by at least one processor, cause the at least one processor to receive network information and enclosure information associated with the plurality of the computing nodes, identify a plurality of fault domains based on network information and the enclosure information, and select the two or more computing nodes from the plurality of fault domains for federating the cluster. Network information is indicative of network topology between the plurality of computing nodes. Enclosure information is indicative of a configuration of an enclosure associated with a corresponding computing node. Each fault domain includes one or more computing nodes impacted by at least one of a corresponding network fault event and a corresponding enclosure fault event. The two or more computing nodes includes a first computing node from a first fault domain and a second computing node from a second fault domain.

FIG. 1 is a block diagram of a system 100 for federating a cluster from a plurality of interconnected computing nodes. The system 100 includes three example racks 105, 110 and 115. Each rack comprises one or more Top of Rack (ToR) switches (107, 117 and 127), and master and satellite switches (125, 135 and 145), and a plurality of servers (108, 109, 118, 119, 128, 137, 138, 139, 147, 148, 157, 158, and 159). Communication between the servers in three racks is enabled via the ToR switches. The switches and the servers are housed within the racks. For example, rack 105 houses ToR switch 107, servers 108 and 109, and blade server enclosure or chassis 155. The server enclosure 155 contains a master switch 125 and blade servers 137, 138 and 139. The blade server 137, 138 and 139 share the master switch 125 and communicate to the ToR switch 117 via the master switch 125. Similarly, rack 110 houses ToR switch 117, servers 118 and 119, and blade server enclosure 165. The blade server enclosure 165 contains a satellite switch 135 and blade servers 147 and 148. The satellite switch 135 acts as a port extender for the master switch 125 and accordingly the blade servers 147 and 148 communicate via the master switch 125. Similarly, rack 115 houses ToR switch 127, server 128, and server enclosure 175. The server enclosure 175 contains a satellite switch 145 and blade servers 157, 158 and 159. The satellite switch 145 acts as a port extender for the master switch 125 and accordingly the blade servers 157, 158 and 159 communicate via the master switch 125. Servers 108 and 109 communicate through the ToR switch 107. Similarly server 118 and 119 communicate through ToR 117 and server 128 communicate through ToR 127.

Each computing node or server can be either a bare-metal server or can be a hypervisor by itself. A hypervisor can include multiple virtual machine nodes and virtual switches. The virtual switches provide network connectivity to the virtual machine nodes. Link aggregation group (LAG) and Multi-LAG and MC teaming techniques may be used to provide high availability and resiliency. For example, server 108 may comprise two virtual machine nodes and a virtual switch. The virtual nodes are connected to the ToR switch 107 via the virtual switch.

Additionally, one or more sets of servers from the plurality of servers are blade servers (137, 138, 139, 147, 148, 157, 158, and 159) and are installed within server enclosures (155, 165 and 175). A server enclosure (e.g. enclosure 155) comprising a plurality of blade servers (137, 138 and 139) includes a common power source and can communicate with each other using a switch (e.g. master switch 125). In an embodiment, a plurality of blade servers in two enclosures (155 and 165) may share a master switch 125. The servers in the enclosure 165 are connected to the master switch 125 via a satellite switch 135. Communication between servers (147 and 148) in enclosure 165 and other servers (e.g. server 128) happens via the master switch 125 and satellite switch 135.

As generally described herein, a computing node refers to a computing device on a network, either a virtual or physical machine, such as a personal computer, a cell phone, a printer, or a server, among others. Each node may include a set of physical hardware that includes any number of processing resources (e.g., central processing units, graphics processing units, microcontrollers, application-specific integrated circuits, programmable gate arrays, and/or other processing resources), storage resources (e.g., random access memory, non-volatile memory, solid state drives, hard disk drives HDDs, optical storage devices, tape drives, and/or other suitable storage resources), network resources (e.g., Ethernet, IEEE 802.11 Wi-Fi, and/or other suitable wired or wireless network resources), I/O resources, and/or other suitable computing hardware. Each node may be connected to every other node in the cluster and may be capable transferring data and applications to every other node in the cluster.

Additionally, the system 100 also includes a controller 129 for federating a cluster from the plurality of the computing nodes. User workloads are deployed on clusters of computing nodes. A plurality of clusters may be created using the plurality of the computing nodes. In order to automatically create or spin up the clusters with nodes, the controller 129 selects and group the nodes based on physical placement of the nodes and network topology between the nodes.

Clusters are systems which function as a closely coupled integrated unit taking the hybrid approach of combining the characteristics of loosely (physical separation of processors and independent instance of operating systems) and tightly coupled systems (physical proximity of processors and sharing of memory/operating systems instance). A cluster system includes closely coupled multiple systems running a similar instance of operating system software with the ability to share resources like storage, memory. Examples include Kubernetes, vSphere, GlusterFS and other such clustering software which distribute roles across multiple nodes providing both scalability and also resiliency.

In a large scale environment such as system 100, the controller 129 dynamically identifies the placement of the nodes in the racks and in the network topology and identifies multiple fault domains. The controller 129 collect the relevant information about the physical and virtual servers along with the network topology. The information is analyzed and a graph model is created. The graph model is used in order to deploy cluster using a tree traversal alternating between left and right nodes. Upon receiving a request to dynamically create a cluster, the controller 129 dynamically allocating nodes from different fault domain zones by traversing the graph model. Accordingly, the controller 129 ensures maximum fault isolation among the nodes of cluster while selecting nodes of the cluster and also ensures effective balanced infrastructure. This is further explained in the description of the FIG. 2.

Figure 2:
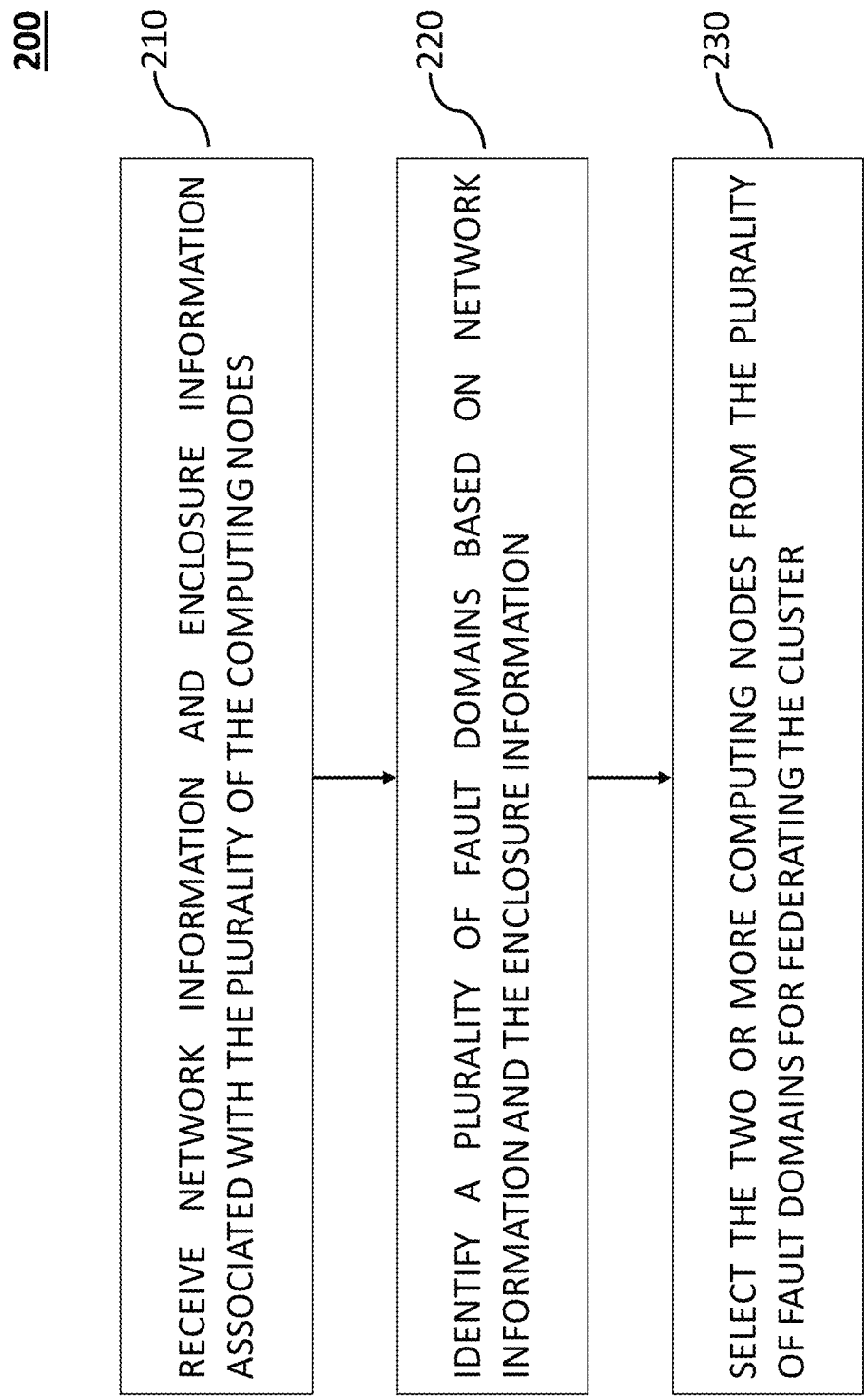
FIG. 2 is a flowchart of an example method for federating a cluster from a plurality of computing nodes.

FIG. 2 illustrates a method 200 for federating a cluster from the plurality of computing nodes. At step 210, the controller 129 receives network information and enclosure information associated with the plurality of the computing nodes. Network information is indicative of network topology between the plurality of computing nodes. Enclosure information is indicative of a configuration of an enclosure associated with a corresponding computing node. In an example, enclosure information includes information regarding the power unit utilized by the corresponding computing node.

In an example, network information is determined based on Link Layer Discovery Protocol (LLDP) packets exchanged between the computing nodes and the network devices. Additionally, the network information is determined on the basis of the Management Information Databases (MIB) of the computing nodes and the network devices. In an example, the controller 129 utilizes the chassis identifier and port identifier to determine the network device connected to the computing node. Based on this information the network topology is identified.

In an example, the network information comprises Internet Protocol addresses of the computing nodes, port group information of the ports on the computing nodes, Local Area Network information of the computing nodes. In an example, one or more computing nodes are connected over a virtual local area network. Accordingly, the Local Area Network (LAN) information includes information about physical and virtual LANs.

In an example, the plurality of interconnected computing nodes includes a first set of physical nodes and a second set of virtual nodes. In an example, one or more computing nodes are interconnected via a virtual switch (vSwitch). Accordingly, the network information comprises details of the virtual switch and nodes connected by the virtual switch.

At step 220, the controller 129 identifies a plurality of fault domains based on network information and the enclosure information. Each fault domain includes one or more computing nodes impacted by at least one of a corresponding network fault event and a corresponding enclosure fault event. In an example, the controller 129 generate a graph model from the network information and the enclosure information. Each node from the graph model is indicative of a computing node or a network device or any other device associated with a corresponding computing node. Each sub-tree in the graph model, comprising a root node and one or more child nodes, is indicative of a fault domain. The one or more computing nodes associated with the child nodes of the sub-tree are impacted by a fault associated with a device associated with the root node of the sub-tree. Accordingly, based on the sub-trees, the controller 129 identifies the plurality of fault domains. In an example, the controller 129 generates a graph model such that the nodes with the least children are placed in the left most and right most positions and the nodes with more children as compared to the other sibling nodes, are placed closer to the center on the basis of the number of children. For example, based on sections of the network topology as shown in FIG. 1, the controller 129 generates a graph model 300 and graph model 400 illustrated in FIGS. 3 and 4.

The graph model 300 includes a root node 310 and two child nodes: node 330 and node 325. The nodes 330 and 325 are associated with TOR switches 107 and 117. In an example, the root node 310 is a hypothetical device and is indicative of the network. The node 325 has two child nodes 335 and 345 which are associated with the servers 118 and 119 in the second rack 110. Since the servers 118 and 119 are connected to the other devices in the system 100 via TOR switch 117, accordingly a fault in the TOR switch 117 would affect both the servers 118 and 119. This is reflected by the sub tree 315 comprising the parent node 325 (representative of TOR switch 117) and child nodes 335 and 345 (representative of servers 118 and 119). Accordingly, the sub tree 315 represents a fault domain linked with a fault in the TOR switch 117.

Similarly, the node 330 has three child nodes 355, 365 and 350. Nodes 355 and 365 are associated with the servers 108 and 109 in the first rack 105. Node 350 is associated with master switch 125. Since the servers 108 and 109, and master switch 125 are connected to the other devices in the system 100 via TOR switch 107, accordingly a fault in the TOR switch 107 would affect the servers 108 and 109, and the master switch 125. This is reflected by the sub tree comprising the parent node 330 (representative of TOR switch 107) and child nodes 350, 355 and 365 (representative of master switch 125, and servers 108 and 109; and their children). Accordingly, the sub tree 317 represents a fault domain linked with a fault in the TOR switch 107. Additionally, since the nodes 355 and 365 have less children (i.e. no children in this case) as compared to node 350 (which has four children), the nodes 355 and 365 are placed in the left and right most positions, while the node 350 is placed in between the two nodes 355 and 365.

Moreover, node 350 has four child nodes 375, 385, 395 and 360. The child nodes 375, 385, 395 and 360 are associated with servers 137, 138 and 139 and satellite switch 135. Since the servers 137, 138 and 139 and satellite switch 135 are connected to the TOR switch 107 via the master switch 125, accordingly a fault in the master switch 125 would affect the servers 137, 138 and 139, and satellite switch 135. This is reflected by the sub tree comprising the parent node 350 (representative of master switch 125) and child nodes, 360, 375,385 and 395 a (representative of satellite switch 135, and servers 137, 138 and 139). Accordingly, the sub tree represents a fault sub-domain linked with a fault in the master switch 125. This fault sub-domain is included within the fault domain associated with the ToR switch 107. Additionally, since the nodes 385, 395 and 375 have less children (i.e. no children in this case) as compared to node 360 (which has two children), the nodes 375, 385 and 395 are placed in the left and right most positions, while the node 360 is placed in between the nodes 375 and 395.

Accordingly, based on the number of sub-trees in the graph model 300, the controller 129 determines the fault domains (e.g. two fault domains and two sub fault domains) in the system 100. For example, based on the graph model 300, the controller 129 determines a fault domain 317 associated with ToR switch 107 and a fault domain 315 associated with ToR switch 117. Additionally, the controller 129 determines a fault sub-domain associated with the master switch 125 within the fault domain 317. Similarly, the controller 129 determines a fault sub-domain associated with the satellite switch 135 within the fault sub-domain associated with the master switch 125.

At step 230, the controller 129 selects two or more computing nodes from the plurality of fault domains for federating the cluster. A first computing node from the two or more computing nodes, is from a first fault domain and a second computing node from the two or more computing nodes is from a second fault domain. In an example, the first and second fault domains form a disjoint set, such that every node from the first fault domain is distinct from the nodes of the second fault domain.

In an example, the controller 129 utilizes the graph model 300 to select the two or more computing nodes for federating the cluster. In an example, the controller 129 selects the first computing node and the second computing node by traversing from root of the graph model to extreme left most node in the graph model and to the right most node in the graph model. The computing node associated with the extreme left most node, is selected as the first computing node and the computing node associated with the extreme right most node, is selected as the second computing node. For selecting additional nodes for federating the cluster, the controller 129 follows the above mentioned sequence of traversing inwards in left and right alternatively from the root of the graph model, selecting nodes from fault domains from which no nodes were previously selected. In no additional fault domains exist i.e. at one node has been selected from all the fault domains, the process is repeated by selecting nodes from existing fault domains.

For example, upon receiving a request to federate a cluster with five nodes, the controller 129 utilizes the graph model 300 to determine the five nodes required. The graph model 300 is based on a network topology of a section of the system 100 comprises elements of rack 105 and rack 110. In order to make the example simple, elements of rack 115 have not been considered. Starting from the root node 310, the controller 129 traverses to the left most node, which in the current case is node 345. Then again starting from the root node 310, the controller 129 traverses to the right most node which in the current case is node 355. Accordingly, servers associated with nodes 345 and 355 (i.e. servers 118 and 109 respectively) are selected as first and second nodes for federating the cluster. Then the controller 129 repeats the traversal to identify the third and fourth nodes. Starting from the root node 310, the controller 129 traverses to the left most node, which in the current case is node 335. Since, the node 335 is from the first fault domain (i.e. fault domain of ToR 117), the controller 129 checks from any fault domains from which no node has been allocated yet. Since there are no such fault domains left, the node 335 is selected. Then again starting from the root node 310, the controller 129 traverses to the right most node which in the current case is node 365. Accordingly, servers associated with nodes 335 and 365 (i.e. servers 119 and 108 respectively) are selected as third and fourth nodes for federating the cluster. Then for allocating the fifth node, controller 129 traverses to the left most node which is node 385. Accordingly, server 138 associated with node 385 is allocated to the cluster by the controller 129 as the fifth node.

Accordingly, the controller 129 allocates servers 108, 109, 118, 119 and 138 to federate the cluster. By selecting two nodes from the first fault domain and three nodes from the second fault domain, the resiliency of the cluster from ToR failure is improved. Moreover, since the nodes are allocated on the basis of left and right most traversals, the middle nodes with most children are lowered in preferrence. Due to this, the physical sense, servers with less dependencies/point of failures are preferred over servers with more dependencies and points of failures. This makes the cluster even more resilient.

In another example, the controller 129 selects the two or more computing nodes based on a domain distance matrix and fault domain. The domain distance matrix comprises distance vectors between the computing nodes of the fault domains. The distance vector$_{ij}$ is a representation of a function of number of hops from Node$_i$ to Node$_j$. The value of the distance vector between two nodes is indicative of the degree of isolation between the nodes. In an example, the distance vector between two nodes is calculated on the basis of a path between the two nodes where the path runs through the root node. Distance between two nodes is marked with an asterisk in the matrix. Based on the entries of the domain distance matrix, the controller 129 determines two or more computing nodes such that the distance vector is minimum and the computing nodes are from different fault domains.

For example, FIG. 6 illustrates a domain distance matrix 600 calculated by the controller 129 for the graph model 400 generated in accordance with a section of the system 100. The section of the system 100 comprises elements of rack 105, rack no and ToR switch 127 and server 128 of rack 115. In order to make the example simple, some elements of rack 115 have not been considered. Upon receiving a request to federate a cluster with four nodes, the controller 129 utilizes the domain distance matrix 600.

Starting arbitrarily with node 435 as the first node, the controller 129 determines a node with the minimum distance and from a different fault domain. On the basis of the domain distance matrix, the controller 129 selects one of nodes 455, 465 and 468 since all these nodes are from a different fault domain and have the least distance of 4 hops (calculated based on the path based on number of edges via the root node 410). Node 445 is not selected since it is from the same fault domain (as indicated by an asterisk). Accordingly, the controller 129 determines servers or computing nodes associated with nodes 435 and 455 (servers 109 and 119) as first and second computing nodes to be allocated for federating the cluster. Accordingly, for selecting the third and fourth computing nodes, the controller 129 selects a node that is from a fault domain from which no existing has been assigned. If no such fault domain exists, the controller 129 selects a node randomly. In the current case, the controller 129 selects the node 468. On the basis of the domain distance matrix, the controller 129 selects one of nodes 445 and 465 since both nodes are from a different fault domain and have the least distance of 4 hops. Accordingly, the controller 129 determines servers or computing nodes associated with nodes 468 and 445 (servers 128 and 109) as third and fourth computing nodes to be allocated for federating the cluster.

In an example, the edges of the graph model (300 and 400) are assigned weights or scores in accordance with one or more physical properties associated with the computing nodes. For example, the edges are assigned weights based on the bandwidth capacity between the computing nodes and the network devices. For example, in FIG. 3, edge between node 325 and 345, and edge between node 325 and 335 are assigned scores based on the bandwidth capacity between the servers 118, 119 and the ToR switch 117 of the rack 2. In a example, the bandwidth capacity between server 118 and ToR switch 117 is 25 mbps and between server 119 and ToR switch 117 is 50 mbps. Accordingly the edge between node 325 and 345 is assigned a weight of value 1 and the edge between node 325 and 335 is assigned a weight of value 2. In another example, the weights on the edges are assigned based on the life expectancy associated with the network or computing devices. In yet another example, the edge weights are based on processing capability of the computing nodes. In an example, the controller 129 utilizes the edge weights in selecting the computing nodes for federating a cluster. In an example, the distances in the distance domain matrix by calculated by dividing the sum of the numbers edges by the sum edge weights.

While FIG. 2 is explained using physical computing nodes, the graph model may be generated using physical and virtual nodes. The virtual nodes as mentioned above may include virtual computing nodes (virtual machines) and virtual switches. Additionally, protocols such as link aggregation protocol, MC teaming etc., may be represented as single edges in the graph model.

Figure 3:
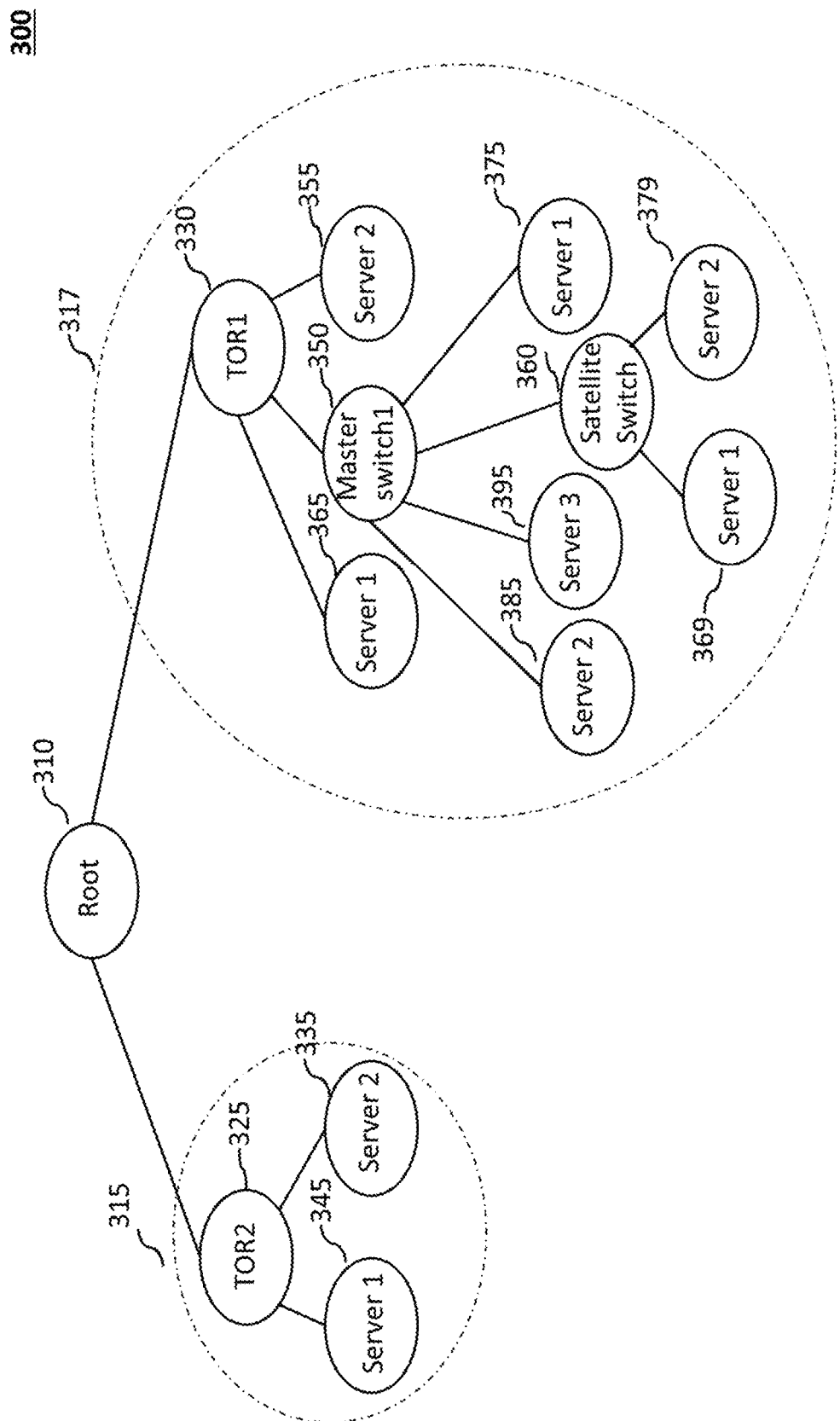
FIG. 3 is an example graph model of a section of a system comprising a plurality of computing nodes.

FIG. 3 illustrates an example graph model 300 of a section of the system 100. The section of the system 100 comprises elements of rack 105 and rack 110. In order to make the example simple, elements of rack 115 have not been considered.

Figure 4:
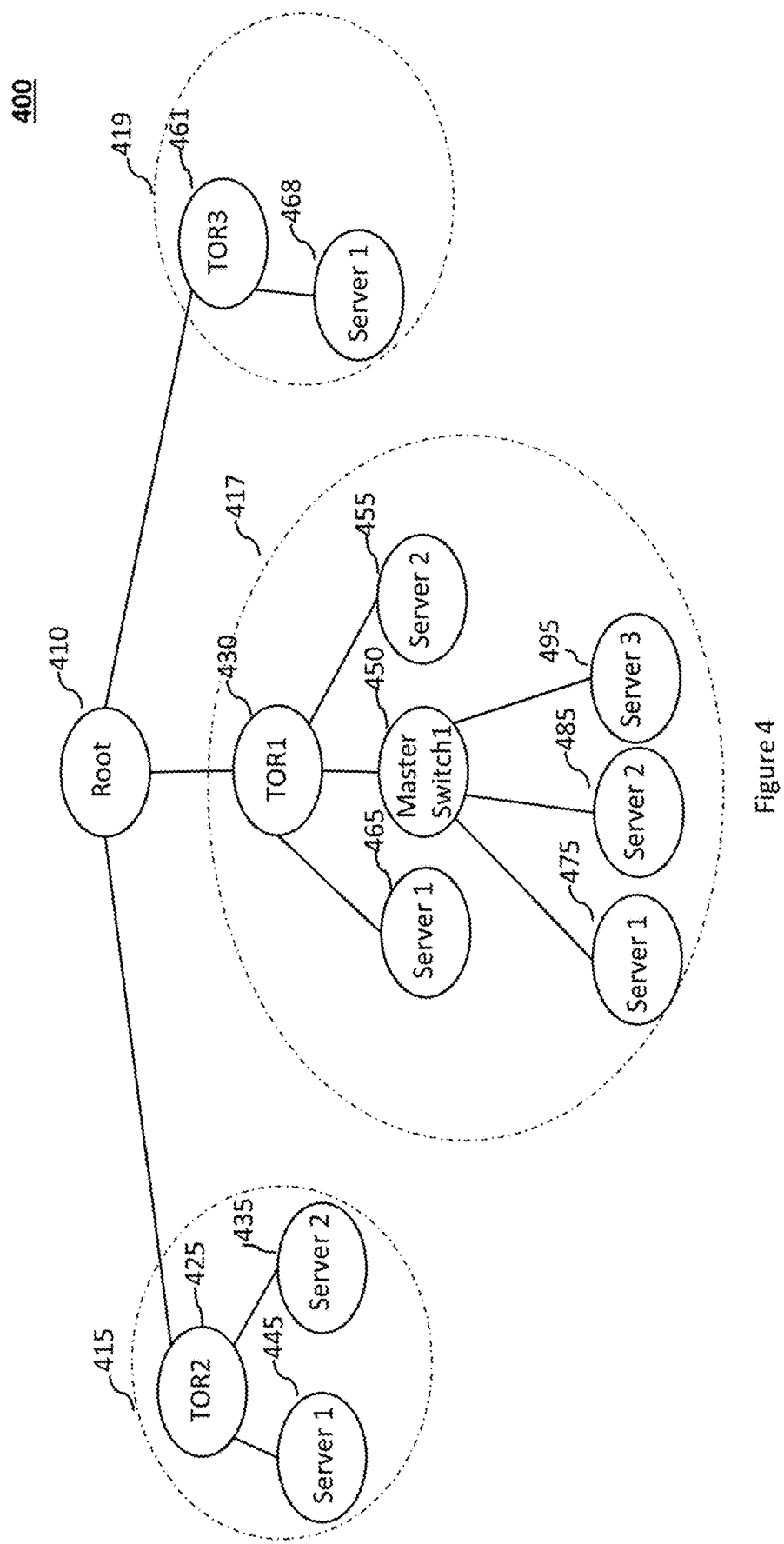
FIG. 4 is another example graph model of another section of a system comprising a plurality of computing nodes.

FIG. 4 illustrates an example graph model 400 of a section of the system 100. The section of the system 100 comprises elements of rack 105, rack 110 and ToR switch 127 and server 128 of rack 115. In order to make the example simple, some elements of rack 115 have not been considered.

Figure 5:
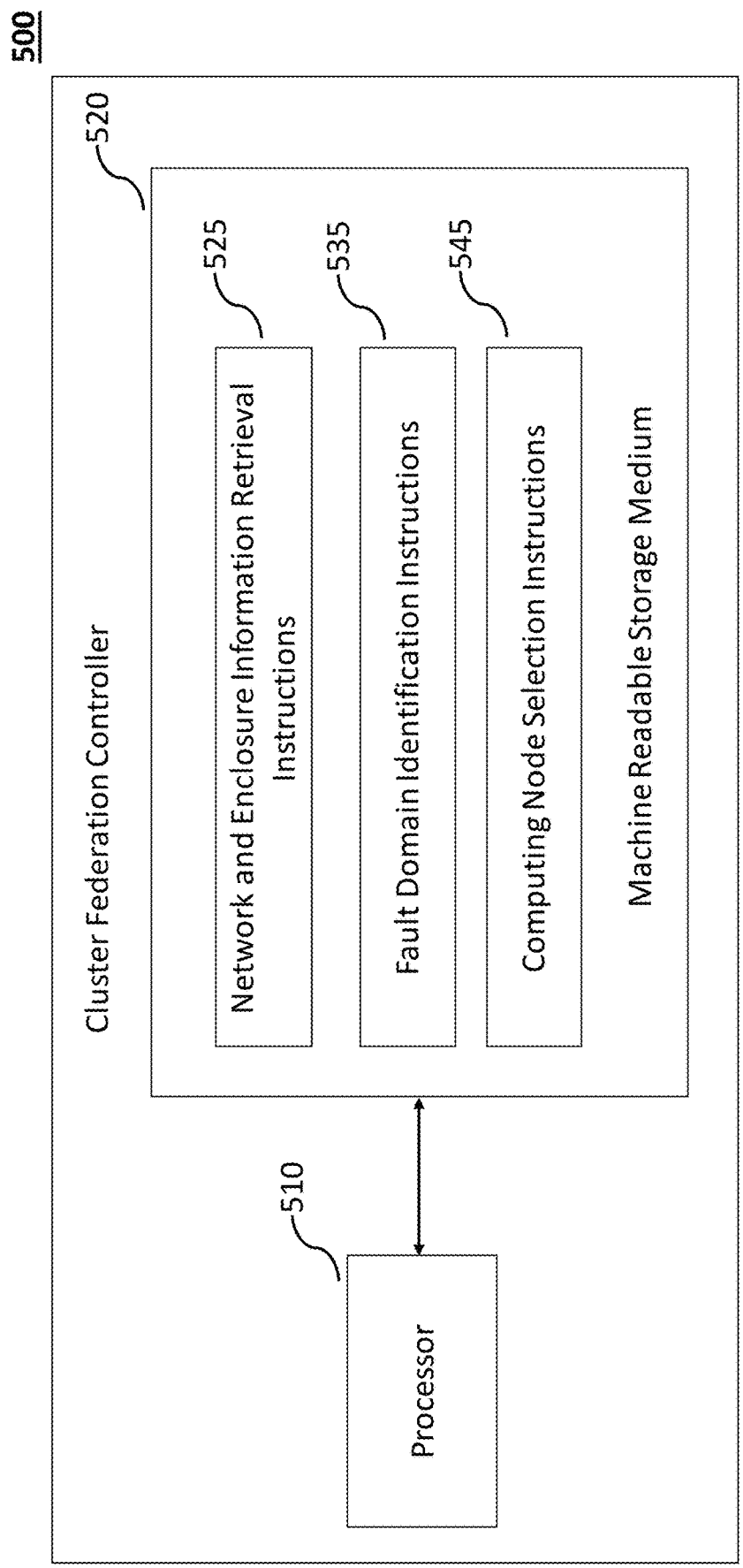
FIG. 5 is a block diagram of an example controller with machine-readable medium for federating a cluster from a plurality of computing nodes.

FIG. 5 is a block diagram of a controller 500 with machine-readable medium 520 for federating a cluster from a plurality of computing nodes. Machine-readable medium 520 is communicatively coupled to a processor 510. The controller 500 (machine-readable medium 520 and processor 510) may, for example, be included as part of computing system 100 illustrated in FIG. 1 (for example as controller 129). Although the following descriptions refer to a single processor and a single machine-readable storage medium, the descriptions may also apply to a system with multiple processors and/or multiple machine-readable storage mediums. In such examples, the instructions may be distributed (e.g., stored) across multiple machine-readable storage mediums and the instructions may be distributed (e.g., executed by) across multiple processors.

Processor 510 may be central processing units (CPUs), microprocessors, and/or other hardware devices suitable for retrieval and execution of instructions stored in machine-readable storage medium 520. In the example shown in FIG. 5, processor 510 may fetch, decode, and execute machine-readable instructions 520 (including instructions 525-545) for federating a cluster from a plurality of computing nodes. As an alternative or in addition to retrieving and executing instructions, processor 510 may include electronic circuits comprising a number of electronic components for performing the functionality of the instructions in machine-readable storage medium 520. With respect to the executable instruction representations (e.g., boxes) described and shown herein, it should be understood that part or all of the executable instructions and/or electronic circuits included within one box may, in some examples, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), a nonvolatile RAM (NVRAM) (e.g., RRAM, PCRAM, MRAM, etc.), an Electrically-Erasable Programmable Read-Only Memory (EEPROM), a flash memory, a storage drive, an optical disc, and the like. Alternatively, machine-readable storage medium 520 may be a portable, external or remote storage medium, for example, that allows a computing system to download the instructions from the portable/external/remote storage medium. In this situation, the executable instructions may be part of an "installation package". As described herein, machine-readable storage medium 520 may be encoded with executable instructions for federating a cluster from a plurality of computing nodes.

Referring to FIG. 5, network and enclosure information retrieval instructions 525, when executed by processor 510, may cause the processor to retrieve network information and enclosure information associated with the plurality of the computing nodes. Network information is indicative of network topology between the plurality of computing nodes. Enclosure information is indicative of a configuration of an enclosure associated with a corresponding computing node. Fault domain identification instructions 535, when executed by the processor 510, may cause the processor to identify a plurality of fault domains based on network information and the enclosure information. Each fault domain includes one or more computing nodes impacted by at least one of a corresponding network fault event and/or a corresponding enclosure fault event. Computing node selection instructions 545, when executed by the processor 510, may cause the processor to select the two or more computing nodes from the plurality of fault domains for federating the cluster. A first computing node from the two or more computing nodes, is from a first fault domain and a second computing node from the two or more computing nodes is from a second fault domain.

In an example, the non-transitory machine-readable storage medium comprises further graph generation instructions that, when executed by at least one processor, cause the at least one processor to generate a graph model from the network information and the enclosure information.

Accordingly, the current invention discloses one or more example methods by which a network information and enclosure information of the hybrid environment is analysed and represented as a graph model. Multiple fault domains are identified based on the graph model. Then, the graph model is used to select a group of nodes that are in different fault domains for federating clusters dynamically. The current disclosure enables identification of fault domains, automatic ability to spin up clusters with hosts spread across multiple fault domains by software driven automatic allocation of nodes to federate the cluster. The current disclosure discloses example methods which are highly scalable across hundreds of racks in a datacenter. Additionally, the current disclosure allows for efficient cluster creation by allocating nodes that are located with a minimum network distance but maximum resiliency.

For example, a storage cluster (like a vSAN or Hyperconverged nodes like GlusterFS) includes each node contributing its local storage. In order protect against any failure, data is distributed across multiple hosts in cluster and replicas are maintained. Replicas are maintained in nodes which are in different fault domain so as to recover from node failure. In order to meet the RPO/RTO (recovery point objective and recovery time objective) it is important to group the hosts to its fault domain. This grouping of nodes into the fault domain (rack) based on the network topology is done in an automated fashion without any human intervention and is used while spinning up clusters by allocating hosts across multiple fault domains.

The foregoing disclosure describes a number of example implementations for federating a cluster from a plurality of computing nodes. The disclosed examples may include systems, devices, computer-readable storage media, and methods for federating a cluster from a plurality of computing nodes. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Additionally, while the current disclosure is described in the context of datacenters, the current disclosure may utilized in other environments such as cloud environments, industrial and factory environments, etc.

Moreover, the disclosed examples may be implemented in various environments and are not limited to the illustrated examples. Further, the sequence of operations described in connection with FIG. 2 is an example and is not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for federating a cluster of computing nodes from a plurality of computing nodes, the method comprising:

receiving, by a controller, network information and enclosure information associated with the plurality of computing nodes, wherein the network information is indicative of a network topology between the plurality of computing nodes, and the enclosure information is indicative of a configuration of an enclosure associated with a corresponding computing node of the plurality of computing nodes;

identifying, by the controller, a plurality of fault domains based on the network information and the enclosure information, wherein each fault domain of the plurality of fault domains includes one or more computing nodes of the plurality of computing nodes impacted by at least one of a corresponding network fault event or a corresponding enclosure fault event, and the plurality of fault domains comprise first, second, and third fault domains;

selecting, based on a graph model, computing nodes from the plurality of fault domains for federating the cluster, wherein the selected computing nodes comprise a first computing node from the first fault domain and a second computing node from the second fault domain, and wherein the selecting of the computing nodes favors selecting the first computing node from the first fault domain with a smaller quantity of computing nodes over the third fault domain with a larger quantity of computing nodes, the graph model comprising a plurality of nodes that represent respective computing nodes of the plurality of computing nodes, the graph model comprising sub-trees representing respective fault domains of the plurality of fault domains, each sub-tree of the sub-trees comprising a root node and one or more child nodes, wherein one or more computing nodes of the plurality of computing nodes represented by the one or more child nodes are impacted by a fault associated with the root node, wherein the method further comprises:

determining, by the controller, that the first fault domain has a smaller quantity of computing nodes than the third fault domain based on a quantity of nodes included in a first sub-tree representing the first fault domain and a quantity of nodes included in a second sub-tree representing the third fault domain; and forming the cluster by allocating, by the controller, the selected computing nodes to the cluster to execute workloads.

2. The method of claim 1, wherein the first and second fault domains form a disjoint set, and every computing node of the first fault domain is distinct from computing nodes of the second fault domain.

3. The method of claim 1, comprising determining, by the controller, the network information based on Link Layer Discovery Protocol (LLDP) packets exchanged between the plurality of computing nodes, and a Management Information Database (MIB) of the plurality of computing nodes.

4. The method of claim 1, wherein the network information comprises Internet Protocol addresses of the plurality of computing nodes, port group information of ports on the plurality of computing nodes, and Local Area Network information of the plurality of computing nodes.

5. The method of claim 1, wherein the plurality of computing nodes comprise a set of physical nodes and a set of virtual nodes.

6. The method of claim 1, wherein the selecting of the computing nodes comprises:

generating, by the controller, the graph model from the network information and the enclosure information; and selecting, by the controller, the first computing node and the second computing node, based on determining, by the controller, that a distance of a path between a first node representing the first computing node and a second node representing the second computing node via a corresponding root node of the graph model is less than distances of paths between other nodes in the graph model, wherein the first and second nodes are part of the plurality of nodes of the graph model.

7. The method of claim 6, wherein the graph model comprises a plurality of edges, wherein each edge of the plurality of edges is assigned an edge weight, the edge weight indicative of one or more network parameters associated with a corresponding computing node.

8. The method of claim 1, wherein the root node of the first sub-tree represents a switch.

9. A cluster management system comprising:
a processor; and
a non-transitory storage medium comprising instructions executable by the processor to:
receive network information and enclosure information associated with a plurality of computing nodes, wherein the network information is indicative of a network topology between the plurality of computing nodes, and wherein the enclosure information is indicative of a configuration of an enclosure associated with a corresponding computing node of the plurality of computing nodes;
identify a plurality of fault domains based on the network information and the enclosure information, wherein each fault domain of the plurality of fault domains includes one or more computing nodes of the plurality of computing nodes impacted by at least one of a corresponding network fault event or a corresponding enclosure fault event, and the plurality of fault domains comprise first, second, and third fault domains;
select, based on a graph model, computing nodes from the plurality of fault domains for federating a cluster of computing nodes, wherein the selected computing nodes comprise a first computing node from the first fault domain and a second computing node from the second fault domain, and wherein the selecting of the computing nodes favors selecting the first computing node from the first fault domain with a smaller quantity of computing nodes over the third fault domain with a larger quantity of computing nodes, the graph model comprising a plurality of nodes that represent respective computing nodes of the plurality of computing nodes, the graph model comprising sub-trees representing respective fault domains of the plurality of fault domains, each sub-tree of the sub-trees comprising a root node and one or more child nodes, wherein one or more computing nodes of the plurality of computing nodes represented by the one or more child nodes are impacted by a fault associated with the root node, the instructions executable by the processor to:
determine that the first fault domain has a smaller quantity of computing nodes than the third fault domain based on a quantity of nodes included in a first sub-tree representing the first fault domain and a quantity of nodes included in a second sub-tree representing the third fault domain; and
form the cluster by allocating the selected computing nodes to the cluster to execute workloads.

10. The cluster management system of claim 9, wherein the first and second fault domains form a disjoint set, and every computing node of the first fault domain is distinct from computing nodes of the second fault domain.

11. The cluster management system of claim 9, wherein the instructions are executable on the processor to determine the network information based on Link Layer Discovery Protocol (LLDP) packets exchanged between the plurality of computing nodes, and a Management Information Database (MIB) of the plurality of computing nodes.

12. The cluster management system of claim 9, wherein the network information comprises Internet Protocol addresses of the plurality of computing nodes, port group information of ports on the plurality of computing nodes, and Local Area Network information of the plurality of computing nodes.

13. The cluster management system of claim 9, wherein the instructions are executable by the processor to:
generate graph model from the network information and the enclosure information; and
select the first computing node and the second computing node, based on determining, by the instructions, that a distance of a path between a first node representing the first computing node and a second node representing the second computing node via a corresponding root node of the graph model, is less than distances of paths between other nodes in the graph model, wherein the first and second nodes are part of the plurality of nodes of the graph model.

14. The cluster management system of claim 9, wherein the root node of the first sub-tree represents a switch.

15. The cluster management system of claim 9, wherein the second sub-tree comprises a root node and one or more child nodes connected from the root node of the second sub-tree, and the second sub-tree further comprises another node that is a root node of a third sub-tree that comprises one or more child nodes connected from the root node of the third sub-tree.

16. A non-transitory machine-readable storage medium storing instructions that, when executed by at least one processor, cause the at least one processor to:
receive network information and enclosure information associated with a plurality of computing nodes, wherein the network information is indicative of a network topology between the plurality of computing nodes, and wherein the enclosure information is indicative of a configuration of an enclosure associated with a corresponding computing node of the plurality of computing nodes;
identify a plurality of fault domains based on the network information and the enclosure information, wherein each fault domain of the plurality of fault domains includes one or more computing nodes of the plurality of computing nodes impacted by at least one of a corresponding network fault event or a corresponding enclosure fault event, and the plurality of fault domains comprise first, second, and third fault domains;
select, based on a graph model, computing nodes from the plurality of fault domains for federating a cluster, wherein the selected computing nodes comprise a first computing node from the first fault domain and a second computing node from the second fault domain, and wherein the selecting of the computing nodes favors selecting the first computing node from the first fault domain with a smaller quantity of computing nodes over the third fault domain with a larger quantity of computing nodes, the graph model comprising a plurality of nodes that represent respective computing nodes of the plurality of computing nodes, the graph model comprising sub-trees representing respective fault domains of the plurality of fault domains, each sub-tree of the sub-trees comprising a root node and one or more child nodes, wherein one or more computing nodes of the plurality of computing nodes represented by the one or more child nodes are impacted by a fault associated with the root node, wherein the instructions when executed cause the at least one processor to:

determine that the first fault domain has a smaller quantity of computing nodes than the third fault domain based on a quantity of nodes included in a first sub-tree representing the first fault domain and a quantity of nodes included in a second sub-tree representing the third fault domain; and cause execution of workloads on the selected computing nodes of the cluster.

17. The non-transitory machine-readable storage medium of claim 16, wherein the first and second fault domains form a disjoint set, and every computing node of the first fault domain is distinct from computing nodes of the second fault domain.

18. The non-transitory machine-readable storage medium of claim 16, wherein the instructions when executed cause the at least one processor to determine the network information based on Link Layer Discovery Protocol (LLDP) packets exchanged between the computing nodes, and a Management Information Database (MIB) of the computing nodes.

19. The non-transitory machine-readable storage medium of claim 16, wherein the root node of the first sub-tree represents a switch.

20. The non-transitory machine-readable storage medium of claim 16, wherein the instructions when executed cause the at least one processor to:

select the first computing node and the second computing node, based on determining, by the instructions when executed by the at least one processor, that a distance of a path between a first node representing the first computing node and a second node representing the second computing node via a corresponding root node of the graph model is less than distances of paths between other nodes in the graph model.

* * * * *